United States Patent
Cheng (10) Patent No.: US 8,886,426 B2
(45) Date of Patent: Nov. 11, 2014

(54) POWER-ASSISTED BICYCLE WITH A GEAR SHIFT SMOOTHENING FUNCTION

(75) Inventor: Chi-Chang Cheng, New Taipei (TW)

(73) Assignee: J.D. Components Co., Ltd., Chang Hua Hsien (TW)

( * ) Notice: Subject to any disclaimer, the term of this patent is extended or adjusted under 35 U.S.C. 154(b) by 289 days.

(21) Appl. No.: 13/565,265

(22) Filed: Aug. 2, 2012

(65) Prior Publication Data
US 2013/0090819 A1 Apr. 11, 2013

(30) Foreign Application Priority Data
Oct. 11, 2011 (TW) .............................. 100136775 A (51) Int. Cl.
| B62M 9/122 | (2010.01) |
| B62K 11/00 | (2006.01) |
| B62D 61/02 | (2006.01) |
| B62M 6/45 | (2010.01) |
| B60L 11/00 | (2006.01) |

(52) U.S. Cl.
CPC .............. *B62M 6/45* (2013.01); *B60L 2200/12* (2013.01); *B60L 11/007* (2013.01)
USPC ............... 701/64; 701/51; 180/218; 180/219; 180/220; 180/221

(58) Field of Classification Search
None
See application file for complete search history.

(56) References Cited

U.S. PATENT DOCUMENTS

| 5,878,831 | A * | 3/1999 | Saito et al. ................. 180/206.2 |
| 6,117,046 | A * | 9/2000 | Ota et al. ......................... 477/79 |
| 6,341,680 | B1 * | 1/2002 | Ota et al. ...................... 192/3.55 |
| 7,290,779 | B2 * | 11/2007 | Takamoto et al. ............ 280/260 |
| 2004/0206188 | A1 * | 10/2004 | Takamoto et al. .............. 73/781 |
| 2005/0189157 | A1 * | 9/2005 | Hays et al. ..................... 180/207 |
| 2012/0226400 | A1 * | 9/2012 | Hsu et al. ......................... 701/22 |
| 2013/0311019 | A1 * | 11/2013 | Tanaka et al. .................... 701/22 |

* cited by examiner

*Primary Examiner* — Calvin Cheung
*Assistant Examiner* — Krishnan Ramesh
(74) *Attorney, Agent, or Firm* — Muncy, Geissler, Olds & Lowe, P.C.

(57) ABSTRACT

A power-assisted bicycle includes a bicycle body with a power assistance provider and a derailleur, a microcomputer, a gear-shift control driver, and sensors. When the microcomputer decides to perform gear shifting, it controls the power assistance provider to provide an assistant power output and the gear-shift control driver to drive the derailleur to shift gears properly subject to a before-shifting time period, an in-shifting time period and an after-shifting time period. Further, the microcomputer controls the power assistance provider to change the current assistant power to a predetermined low assistant power during the before-shifting time period, or to maintain the predetermined low assistant power during the in-shifting time period, or to change the assistant power output to a level higher than the current assistant power and then to return to the said current assistant power after the end of the after-shifting time period.

21 Claims, 10 Drawing Sheets

POWER-ASSISTED BICYCLE WITH A GEAR SHIFT SMOOTHENING FUNCTION

BACKGROUND OF THE INVENTION

1. Field of the Invention

The present invention relates to bicycle technology and more particularly, to a power-assisted bicycle with a gear shift smoothening function that facilitates smooth gear shifting, providing better riding comfort.

2. Description of the Related Art

When shifting gears (gearing up or gearing down) during riding of a conventional power-assisted bicycle, the pedaling rate will be suddenly changed. For example, the pedaling rate will be reduced suddenly after an up shift, or increased suddenly after down shift. However, the rider cannot know in advance when the microcomputer of the power-assisted bicycle will shift gears. Further, the pedaling torque will also be changed suddenly after a gear shifting operation. The sudden change of pedaling rate after a gear shifting operation will make the rider feel awkward and uncomfortable.

Further, because the rider does not know when gear shifting occurs during riding, the rider may pedal the pedals with force or a high assistant power may be provided during gear shifting, causing the chain to become overtensioned and leading to unsmooth shifting or a shifting failure. Therefore, enabling the rider to know in advance when shifting gears and allowing adjustment of the assistant power are important factors for smooth gear shift operations.

SUMMARY OF THE INVENTION

The present invention has been accomplished under the circumstances in view. It is the main object of the present invention to provide a power-assisted bicycle with a gear shift smoothening function, which adjusts the assistant power output during gear shifting, thereby smoothening the gear shift operation.

To achieve this and other objects of the present invention, a power-assisted bicycle with a gear shift smoothening function comprises a bicycle body comprising a power assistance provider and a derailleur; a microcomputer electrically coupled with the power assistance provider and adapted for controlling the power assistance provider to provide an assistant power output; a gear-shift control driver electrically connected to the microcomputer and physically connected to the derailleur for driving the derailleur to shift gears subject to the control of the microcomputer; at least one sensor including at least one of a wheel speed sensor and a pedaling speed sensor and mounted at the bicycle body at a respective selected location and electrically connected to the microcomputer for sensing at least one of the conditions of wheel speed, pedaling speed, pedaling force and slope and providing at least one sensing signal for causing the microcomputer to generate at least one detection result and to determine gearshift timing subject to the at least one detection result. When the wheel speed meets a first condition or the pedaling speed meets a second condition during the operation of the microcomputer to judge gearshift timing, the microcomputer divides the time period of the gear-shifting process into a before-shifting time period, an in-shifting time period and an after-shifting time period, and controls the power assistance provider to provide an assistant power output and the gear-shift control driver to drive the derailleur to shift gears during the three time periods of before-shifting time period, in-shifting time period and after-shifting time period. Further, the microcomputer controls the power assistance provider to change the current assistant power output thereof to a predetermined low assistant power during the before-shifting time period. Further, the microcomputer controls the power assistance provider to maintain the predetermined low assistant power and the gear-shift control driver to drive the derailleur to shift gears during the in-shifting time period. Further, the microcomputer controls the power assistance provider to change the assistant power output from the predetermined low assistant power to a level higher than the said current assistant power output when gearing up during the after-shifting time period, and then controls the power assistance provider to return to the said current assistant power output after the end of the after-shifting time period. Thus, the predetermined low assistant power output is maintained during the time period of the gear-shifting process, smoothening gear shifting, and the assistant power output can be adjusted after a gear shift operation, buffering the sudden change of pedaling torque and avoiding making the rider feel awkward.

Further, during the after-shifting time period when down-shifting, the microcomputer controls the power assistance provider to change its output from the predetermined low assistant power to the aforesaid current assistant power.

Preferably, the predetermined low assistant power is 20% of the maximum assistant power the power assistance provider can provide.

Preferably, the before-shifting time period is below 2 seconds, the in-shifting time period is below 1 second, and the after-shifting time period is below 2 seconds.

Preferably, the power assistance provider is controllable to adjust its assistant power output subject to different slopes or different gear ratios when the power-assisted bicycle is under the assistant mode. Further, the at least one sensor includes a slope sensor.

Preferably, the microcomputer controls the power assistance provider to change its current assistant power output to the predetermined medium assistant power and then to the predetermined low assistant power during the before-shifting time period.

Preferably, the predetermined medium assistant power is directly proportionally changed subject to the pedaling force or chain tension.

Preferably, the assistant power is increased or reduced during the before-shifting time period and the after-shifting time period in a linear relationship relative to time.

Preferably, downshifting is limited to upslope, and prohibited when running down a slope or on a flat ground. The at least one sensor includes a slope sensor.

Preferably, if the microcomputer judges the gear-shift operation is to gear up, the first condition will be that the wheel speed is greater than a predetermined first speed, and the second condition will be that the pedaling speed is greater than a predetermined second speed. If the microcomputer judges the gear-shift operation is to gear down, the first condition will be that the wheel speed is lower than the predetermined first speed, and the second condition will be that the pedaling speed is lower than the predetermined second speed.

It is another object of the present invention to provide a power-assisted bicycle with a gear shift smoothening function, which gives off a warning signal when judged to shift gears, avoiding making the rider feel awkward due to a sudden change of the pedaling torque after gear shifting.

Preferably, the power-assisted bicycle further comprises an alarm electrically connected to the microcomputer and controllable by the microcomputer to give off a warning signal.

Preferably, the alarm is selected from the group of buzzer, light-emitting diode and display device.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1 through 6, a power-assisted bicycle 10 in accordance with a first embodiment of the present invention is shown. The power-assisted bicycle 10 comprises a bicycle body 11, a microcomputer 21, a gear-shift control driver 31, a plurality of sensors 41, and an alarm 51.

Figure 1:
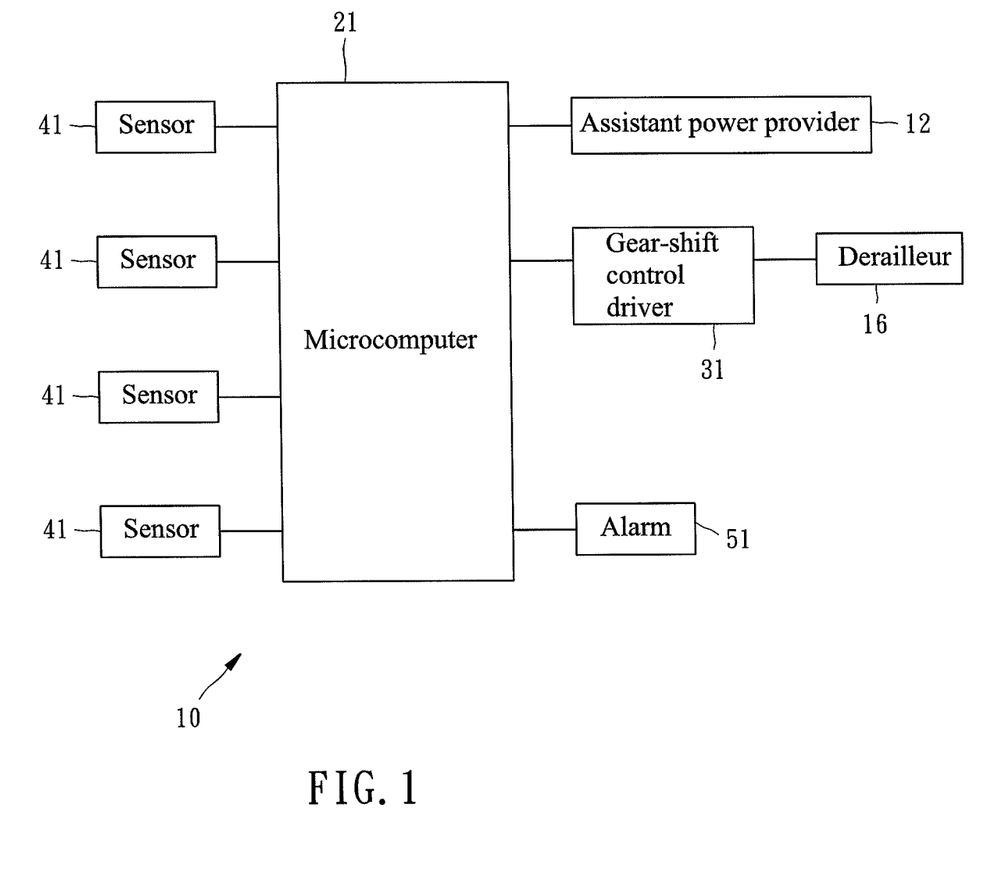
FIG. 1 is a system block diagram of a power-assisted bicycle with a gear shift smoothening function in accordance with a first embodiment of the present invention.
Figure 2:
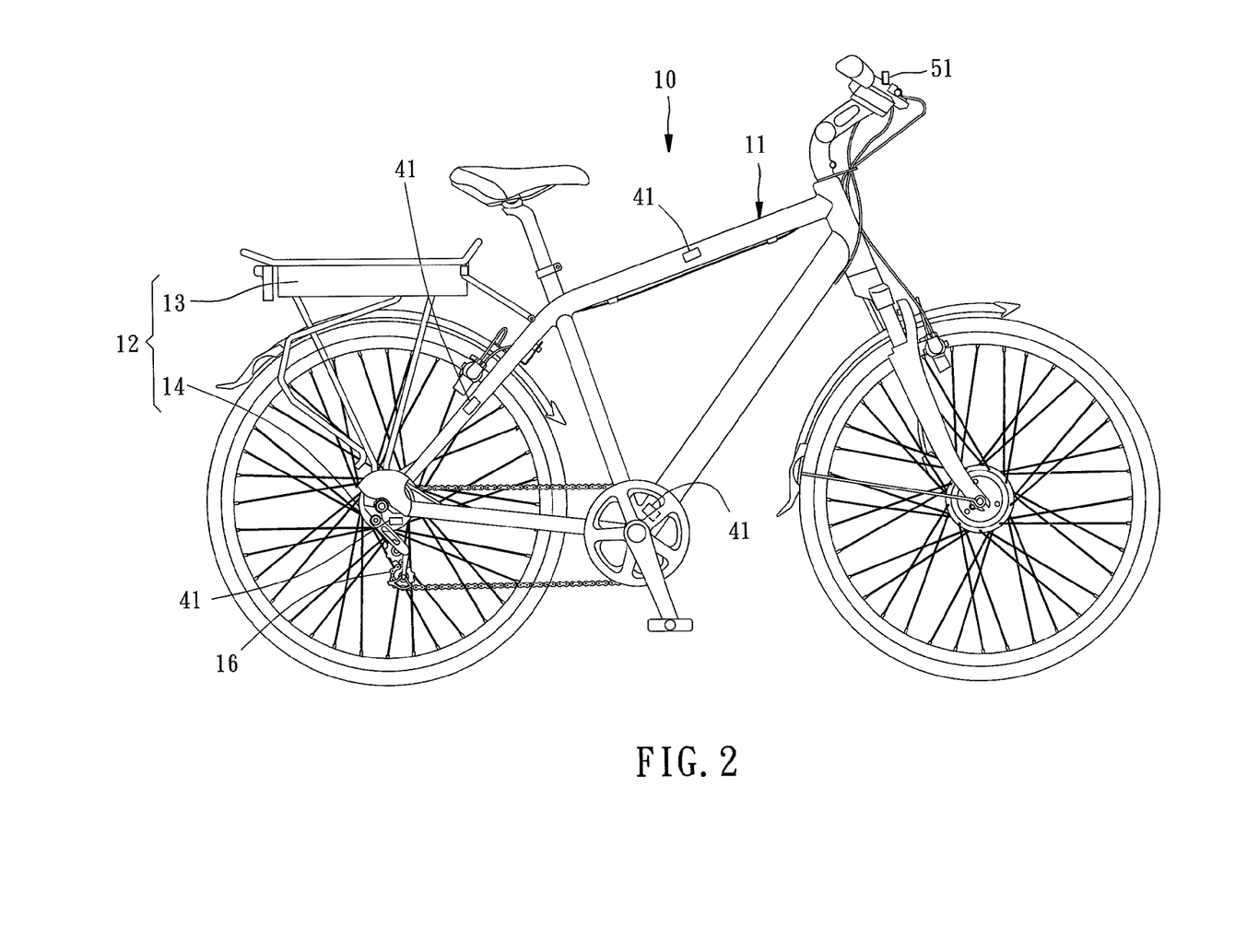
FIG. 2 is a side view of the power-assisted bicycle with a gear shift smoothening function in accordance with the first embodiment of the present invention.

The bicycle body 11 comprises a power assistance provider 12 and a derailleur 16. The power assistance provider 12 comprises a battery 13 and a motor 14. As the power assistance provider 12 is of the known art, no further detailed description regarding the structure and function of the power assistance provider 12 will be necessary.

The microcomputer 21 is electrically coupled with the power assistance provider 12 for controlling the output of the microcomputer 21.

The gear-shift control driver 31 is electrically connected to the microcomputer 21 and physically connected to the derailleur 16 for driving the derailleur 16 to shift gears subject to the control of the microcomputer 21.

The sensors 41 are installed in the bicycle body 11 at selected locations, and electrically connected to the microcomputer 21 for detecting wheel speed, pedaling speed, pedaling force and/or slope, and providing respective sensing signals to the microcomputer 21 so that the microcomputer 21 can generate different detection results subject to different sensing signals from the sensors 41, and determine gearshift timing subject to these detection results. It is to be noted that the sensors include at least one wheel speed sensor or pedaling speed sensor. Further, the microcomputer 21 can determine gearshift timing subject to one but not all of the detection results of wheel speed, pedaling speed, pedaling force and slope.

The alarm 51 is electrically connected to the microcomputer 21 and controllable by the microcomputer 21 to generate a warning signal. In this embodiment, the alarm 51 is a buzzer for generating an audio warning signal. Alternatively, the alarm 51 can be a light-emitting diode or display device capable of emitting light or creating a text message for purposes of warning. As the light-emitting diode or display device is of the known art, no further detailed description or illustration will be necessary.

When the wheel speed meets a first condition or the pedaling speed meets a second condition during the operation of the microcomputer 21 to judge gearshift timing, the microcomputer 21 controls the alarm 51 to generate a warning signal. At the same time, the microcomputer 21 divides the time period of the gear-shifting process into a before-shifting time period T1, an in-shifting time period T2, and an after-shifting time period T3, and controls the power assistance provider 12 to provide assistant power and the gear-shift control driver 31 to drive the derailleur 16 to shift gears during the aforesaid three time periods. When the derailleur 16 is shifted into a lower gear, the gear ratio is relatively lowered. On the contrary, when the derailleur 16 is shifted into a higher gear, the gear ratio becomes relatively higher.

In this first embodiment, if the microcomputer 21 judges the gear-shift operation is to gear up, the aforesaid first condition will be that the wheel speed is greater than a predetermined first speed, and the aforesaid second condition will be that the pedaling speed is greater than a predetermined second speed. If the microcomputer 21 judges the gear-shift operation is to gear down, the aforesaid first condition will be that the wheel speed is lower than the predetermined first speed, and the aforesaid second condition will be that the pedaling speed is lower than the predetermined second speed. The constraint that the wheel speed must be greater than the predetermined first speed or the pedaling speed must be greater than the predetermined second speed when gearing up is to maintain a basic speed for keeping the power-assisted bicycle 10 to move forwards during gear shifting, avoiding pedal problems due to a sudden slow on pedaling speed and facilitating gear shifting.

The constraint that the wheel speed must be lower than the predetermined first speed or the pedaling speed must be lower than the predetermined second speed when gearing down is to prevent an excessive high speed during gear shifting, facilitating gear shifting and preventing a false pedal step or possible danger or injury due to foot sliding.

During the before-shifting time period T1, the microcomputer 21 controls the power assistance provider 12 to change its current assistant power output to the level of a predetermined low assistant power P1. This predetermined low assistant power P1 is below 20% of the maximum assistant power the power assistance provider 12 can provide. According to this first embodiment, this predetermined low assistant power P1 is 10% of the maximum assistant power the power assistance provider 12 can provide. Further, the before-shifting time period T1 is shorter than 2 seconds, for example, 0.8 second in this first embodiment. Further, in this first embodiment, the microcomputer 21 controls the power assistance provider 12 to change its current assistant power output to the level of a predetermined medium assistant power P2 and then to the level of the predetermined low assistant power P1 during the before-shifting time period T1. This predetermined medium assistant power P2 is in a directly proportional relationship relative to the pedaling force or chain tension.

The following Table 1 illustrates the relationship between the predetermined medium assistant power P2 and the pedaling force. In this first embodiment, the predetermined medium assistant power P2 is 5 kgs, equal to 30% of the maximum assistant power the power assistance provider 12 can provide.

TABLE 1

| Pedaling force (Kg) | 0 | 5 | 10 | 15 | 20 | 25 up |
|---|---|---|---|---|---|---|
| Medium assisted power P2 | 10% | 30% | 50% | 70% | 90% | 100% |

Further, when changing the output of the power assistance provider 12 to the predetermined low assistant power P1 during the before-shifting time period T1, downshifting can be limited to upslope, and prohibited when running down a slope or on a flat ground. The aforesaid sensors 41 must include a slope sensor for providing a tilt angle sensing data to the microcomputer 21 for slope recognition. When the power-assisted bicycle 10 is running up a slope, much assistant power shall be provided to overcome increased pedaling load, and the chain may get overtensioned. This problem of overtensioned chain rarely occurs when the power-assisted bicycle 10 is running down a slope or on a flat ground. Therefore, the invention allows downshifting to change the output of the power assistance provider 12 to the level of the predetermined low assistant power P1 during the before-shifting time period T1 only when then the power-assisted bicycle 10 is running up a slope, avoiding overtension of the chain and further unsmooth shifting. When the power-assisted bicycle 10 is running down a slope or on a flat ground, gear shifting can be performed smoothly without changing the assistant power.

During the in-shifting time period T2, the microcomputer 21 controls the gear-shift control driver 31 to drive the derailleur 16 to shift gears while controlling the power assistance provider 12 to maintain the predetermined low assistant power P1. This in-shifting time period T2 is shorter than 1 second, for example, 0.2 second in this first embodiment.

When gearing up during the after-shifting time period T3, the microcomputer 21 controls the power assistance provider 12 to change its output from the level of the predetermined low assistant power P1 to a level higher than its current assistant power output and then to return to its current assistant power output. When gearing down during the after-shifting time period T3, the microcomputer 21 controls the power assistance provider 12 to change its output from the level of the predetermined low assistant power P1 to the level of the aforesaid current assistant power output. This after-shifting time period T3 is shorter than 2 seconds, for example, 1.0 second in this first embodiment.

It is to be noted that during the after-shifting time period T3, assistant power can be adjusted only when gearing up, i.e., assistant power maintains unchanged when gearing down.

During before-shifting time period T1 and the after-shifting time period T3, the assistant power is increased or reduced gradually in a linear relationship relative to time.

The operation of the power-assisted bicycle 10 in accordance with the first embodiment of the present invention is outlined hereinafter.

If the rider sets the power-assisted bicycle 10 in the non-assistant mode during riding, the power assistance provider 12 normally gives no assistant power output, and will provide an assistant power output during gear shifting. Providing an assistant power output during gear shifting facilitates shifting.

Figure 3:
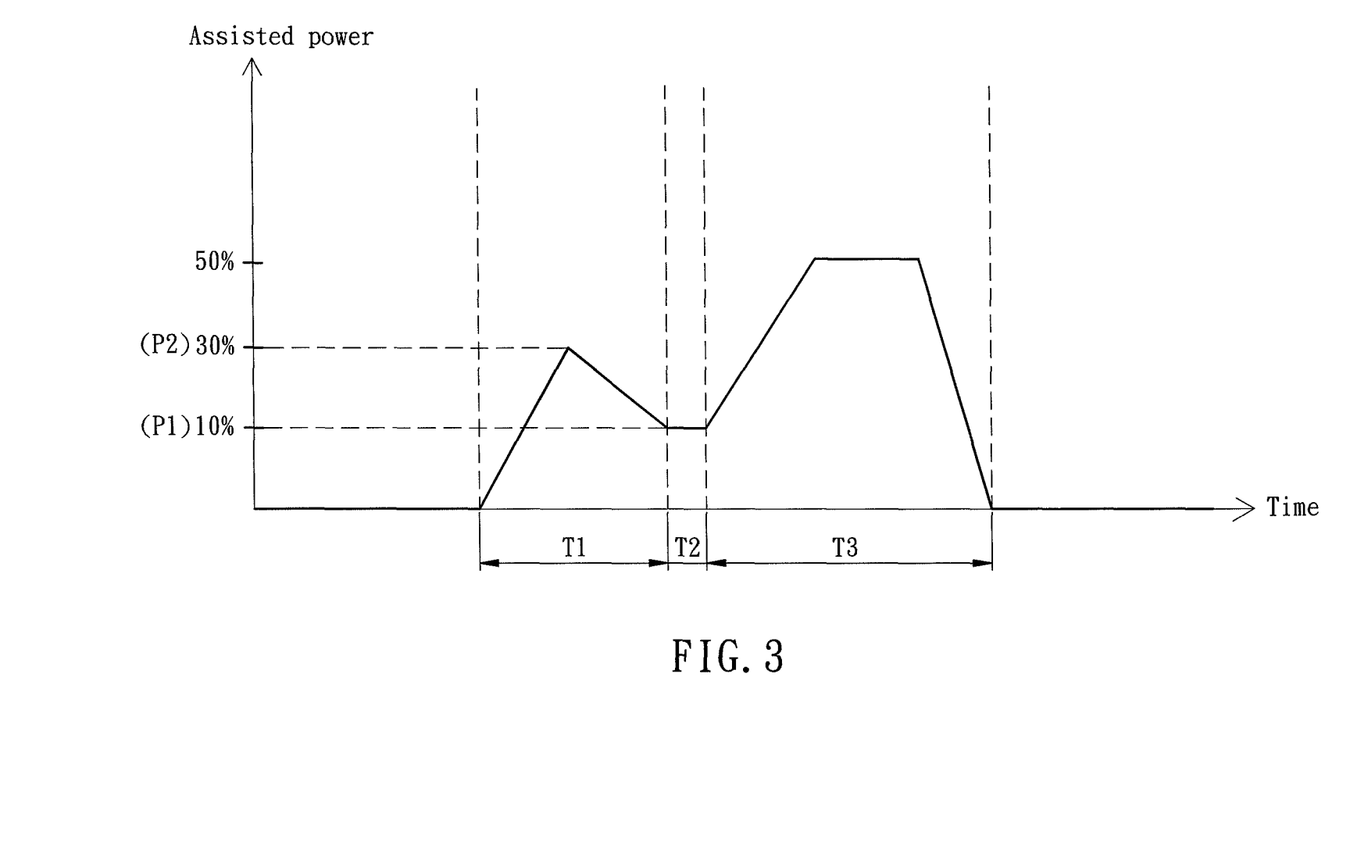
FIG. 3 is a schematic drawing illustrating a change of the assisted power during an upshifting operation under the non-assistant mode according to the first embodiment of the present invention.

Under the non-assistant mode, the current assistant power is zero. When upshifting is determined, the microcomputer 21 controls the alarm 51 to give off a warning signal at first, and performs the corresponding assistant power and gear shifting controls in the aforesaid three time periods, as illustrated in FIG. 3. During the before-shifting time period T1, it is to increase the output of the power assistance provider 12 to the level of the predetermined medium assistant power P2 (i.e., 30%) and then to reduce the output to the level of the predetermined low assistant power P1 (i.e., 10%), thereby assisting engagement between the chain of the power-assisted bicycle 10 and the gear (this is of the known art, no illustration is necessary) for the follow-up gear shifting operation. In the next in-shifting time period T2, it is to maintain the output of the power assistance provider 12 at the level of the predetermined low assistant power P1, facilitating gear shifting. Under this predetermined low assistant power P1, the problem of unsmooth gear shifting due to an overtensioned chain can be prevented. In the next after-shifting time period T3, it is to increase the output of the power assistance provider to a level higher than the aforesaid current assistant power, for example, 50% of the maximum output, and then to return to the level of the current assistant power (i.e., no assistant power). Thus, a warning signal is provided to warn the rider prior to gear shifting, a low assistant power is maintained to smoothen gear shifting during the in-shifting time period, and the assistant power is temporarily increased to avoid making the rider feel awkward due to a sudden change of the pedaling torque after gear shifting.

When encountering a slope during the non-assistant mode, the increase of the output of the power assistance provider to a level higher than the aforesaid current assistant power during the after-shifting time period T3 can be adjusted subject to the angle of the slope, and the adjustment is determined subject to the follow Table 2.

TABLE 2

| | Slope | | | | |
|---|---|---|---|---|---|
| | 0% (ground) | 10% (upslope) | 20% (upslope) | −10% (downslope) | −20% (downslope) |
| Assisted power | 30% | 40% | 50% | 20% | 10% |

From the aforesaid Table 2, it is known that when under the non-assistant mode, the increase of the output of the power assistance provider to the level of 50% of the maximum output during the after-shifting time period T3 of the aforesaid upshifting is under the condition of 20% at upslope.

Figure 4:
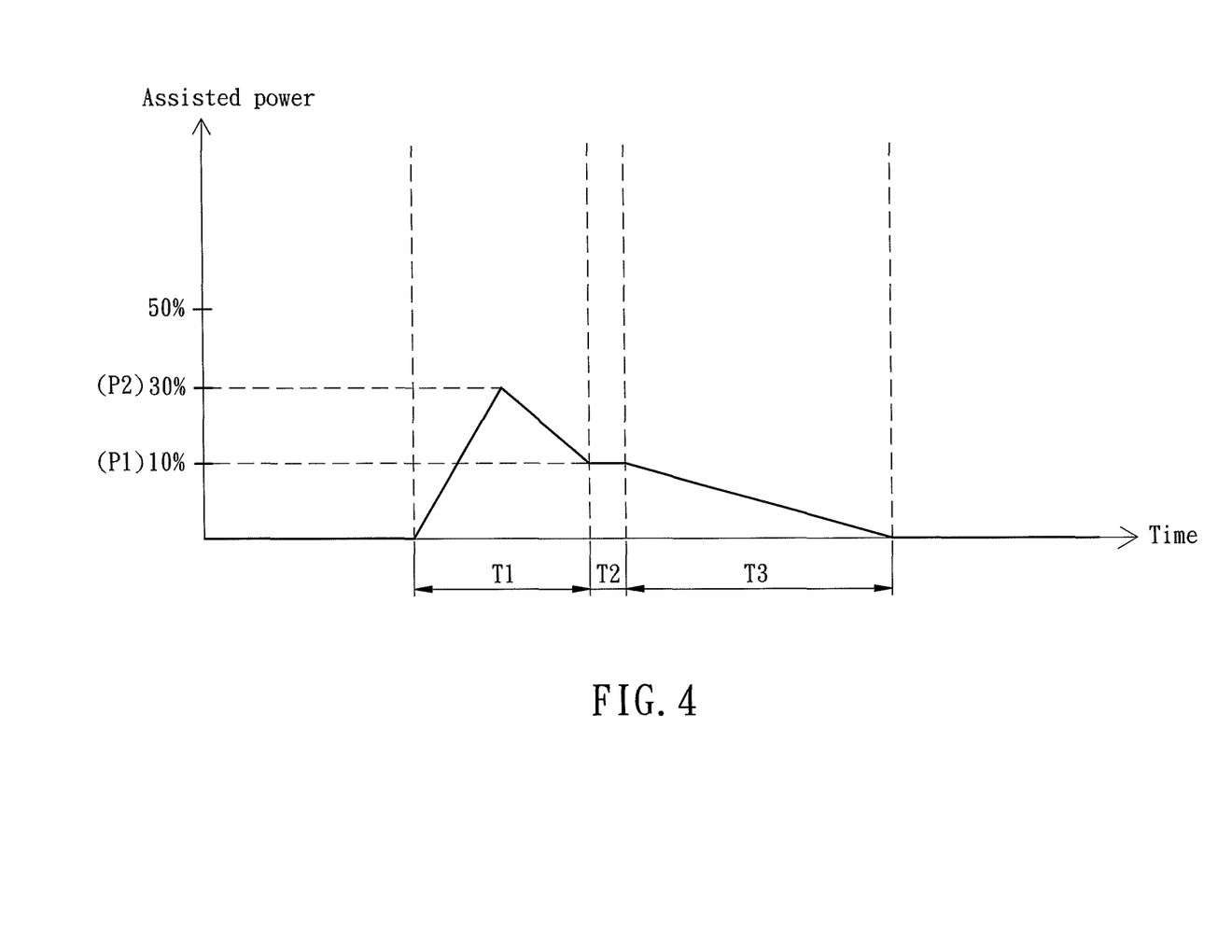
FIG. 4 is a schematic drawing illustrating a change of the assisted power during a downshifting operation under the non-assistant mode according to the first embodiment of the present invention.

If the microcomputer 21 judges to gear down when under the non-assistant mode and the current assistant power is zero, the microcomputer 21 will control the alarm 51 to give off a warning signal at first, and then perform the corresponding assistant power control and gear shifting control during the aforesaid three time periods. During the before-shifting time period T1, the assistant power output is increased to the level of the predetermined medium assistant power P2 (i.e., 30%) and then lowered to the level of the predetermined low assistant power P1 (i.e., 10%) to help chain engagement for the follow-up shifting operation. In the next in-shifting time period T2, the assistant power output is maintained at the level of the predetermined low assistant power P1 to facilitate gear shifting, avoiding overtension of the chain and further unsmooth shifting. In the next after-shifting time period T3, the assistant power output is directly lowered to the level of the aforesaid current assistant power (i.e., zero assistant power). Thus, the invention can give a warning signal to the rider before shifting gears, maintain the assistant power output at the level of the predetermined low assistant power to smoothen gear shifting, and lower the assistant power to buffer the sudden change of pedaling torque and to avoid making the rider feel awkward after gear shifting.

If the rider sets the power-assisted bicycle in the assistant mode (for example, 50%) during riding, the power assistance provider 12 is controlled to provide an assistant power normally, and to adjust its assistant power output during a gear shifting operation, thereby smoothening gear shifting.

Figure 5:
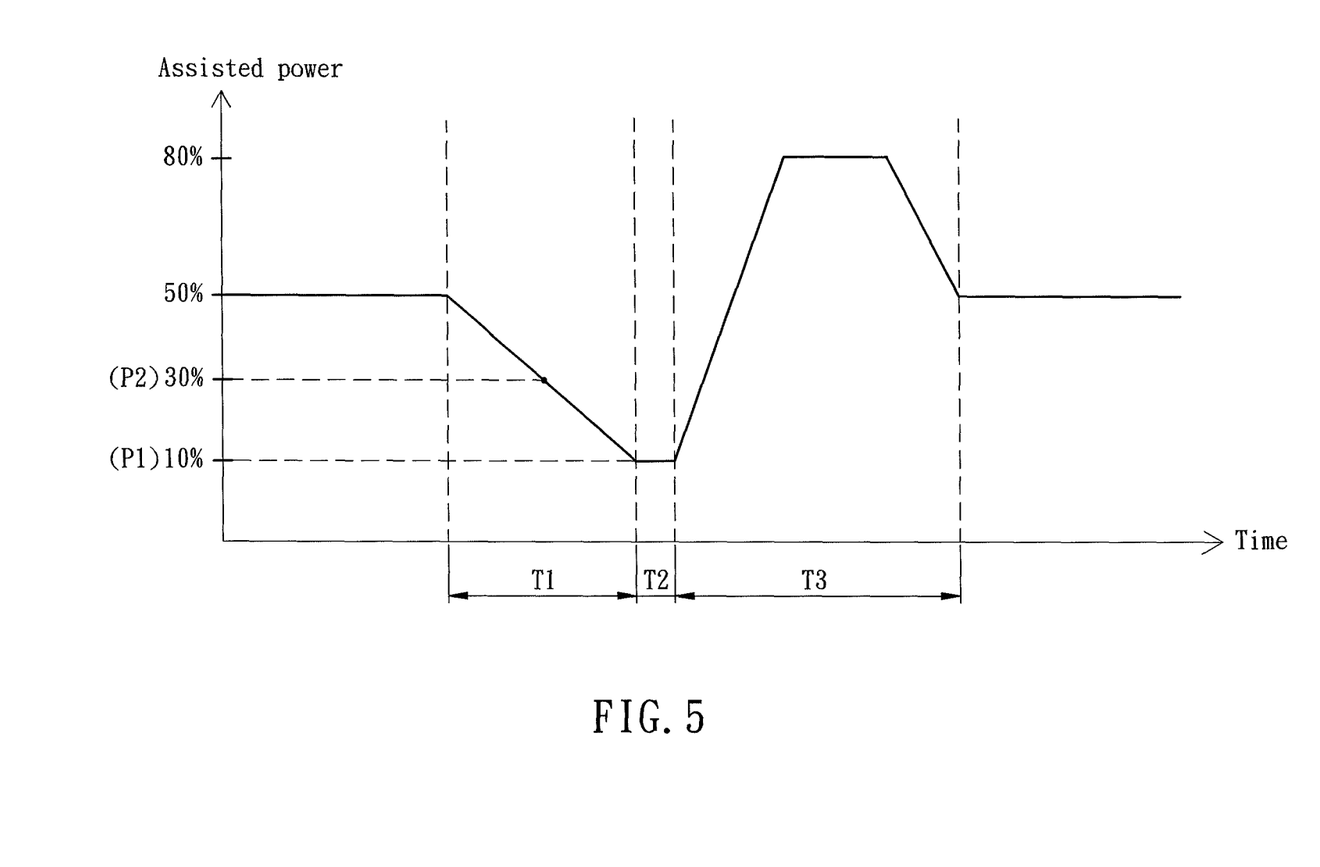
FIG. 5 is a schematic drawing illustrating a change of the assisted power during an upshifting operation under the assistant mode according to the first embodiment of the present invention.

If the microcomputer 21 judges to shift gears when under the assistant mode and when the current assistant power is 50%, the microcomputer 21 controls the alarm 51 to give off a warning signal at first, and then performs the corresponding assistant power control and gear shifting operation control during the aforesaid three time periods, as shown in FIG. 5. During the before-shifting time period T1, it is to reduce the output of the power assistance provider 12 to the level of the predetermined medium assistant power P2 (i.e., 30%) and then to the level of the predetermined low assistant power P1 (i.e., 10%), thereby assisting engagement between the chain of the power-assisted bicycle 10 and the gear for the follow-up gear shifting operation. In the next in-shifting time period T2, it is to maintain the output of the power assistance provider 12 at the level of the predetermined low assistant power P1, facilitating gear shifting. Under this predetermined low assistant power P1, the problem of unsmooth gear shifting due to an overtensioned chain can be prevented. In the next after-shifting time period T3, it is to increase the output of the power assistance provider to a level higher than the aforesaid current assistant power, for example, 80% of the maximum output, and then to return the output to the current assistant power (i.e., 50%). Thus, the invention can give a warning signal to the rider before shifting gears, maintain the assistant power output at the level of the predetermined low assistant power to smoothen gear shifting, and lower the assistant power to buffer the sudden change of pedaling torque and to avoid making the rider feel awkward after gear shifting.

When under the assistant mode, the assistant power before shifting is 50%, or 80% during the after-shifting time period T3, showing a difference of 30%. However, this model is simply an example. In actual practice, the assistant power can be adjusted subject to different gear ratios when shifting gears. For example, if the gear ratio before gear shifting and gear ratio after gear shifting are 0.741/0.632=1.17, add 20% to the 50% assistant power before gear shifting, changing the assistant power output to the level of 70%. If the gear ratio before gear shifting and gear ratio after gear shifting are 0.741/0.632=1.17, add 15% to the 50% assistant power before gear shifting, changing the assistant power output to the level of 65%.

When running on a slope under the aforesaid assistant mode, the assistant power provided during the after-shifting time period T3 of an upshifting operation can be adjusted subject to the angle of the slope, and the adjustment is determined subject to the following Table 3.

TABLE 3

| | Slope | | | | |
|---|---|---|---|---|---|
| | 0% (ground) | 10% (up-slope) | 20% (up-slope) | −10% (down-slope) | −20% (down-slope) |
| Assisted power before gear up | 30% | 40% | 50% | 20% | 10% |
| Assisted power after gear up (gear ratio = 1.1) | 40% | 50% | 60% | 30% | 20% |
| Assisted power after gear up (gear ratio = 1.2) | 50% | 60% | 70% | 40% | 30% |
| Assisted power after gear up (gear ratio = 1.3) | 60% | 70% | 80% | 50% | 40% |

From the aforesaid Table 3, it can be known that when under the assistant mode, the increase of the output of the power assistance provider to the level of 80% of the maximum output during the after-shifting time period T3 of the aforesaid upshifting is under the condition of 20% at upslope. Further, from the aforesaid Table 3, it can also be known that when under the assistant mode, the output of the power assistance provider can be adjusted subject to different slopes and different gear ratios. In this case, the sensors 41 must include a slope sensor for sending the angle of a slope.

Figure 6:
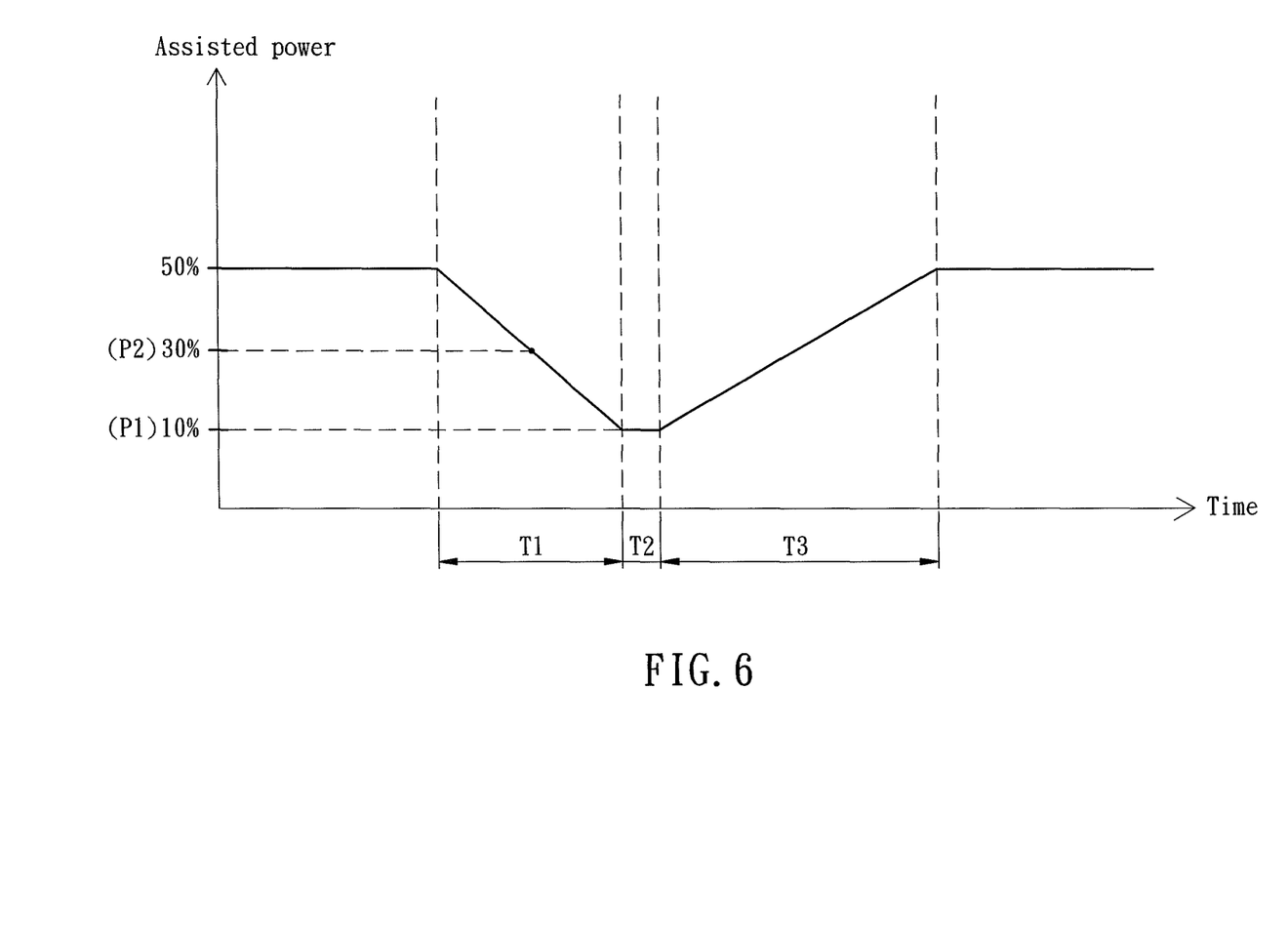
FIG. 6 is a schematic drawing illustrating a change of the assisted power during a downshifting operation under the assistant mode according to the first embodiment of the present invention.

If the microcomputer 21 judges to shift down gears when under the assistant mode and the current assistant power is, for example, 50%, the microcomputer 21 will control the alarm 51 to give off a warning signal at first, and then perform the corresponding assistant power control and gear shifting control during the aforesaid three time periods, as shown in FIG. 6. During the before-shifting time period T1, the assistant power output is lowered to the level of the predetermined medium assistant power P2 (i.e., 30%) and then lowered to the level of the predetermined low assistant power P1 (i.e., 10%) to help chain engagement for the follow-up shifting operation. In the next in-shifting time period T2, the assistant power output is maintained at the level of the predetermined low assistant power P1 to facilitate gear shifting, avoiding overtension of the chain and further unsmooth shifting. In the next after-shifting time period T3, the assistant power output is directly lowered to the level of the aforesaid current assistant power (i.e., 50%). Thus, the invention can give a warning signal to the rider before shifting gears, maintain the assistant power output at the level of the predetermined low assistant power to smoothen gear shifting, and lower the assistant power to buffer the sudden change of pedaling torque and to avoid making the rider feel awkward after gear shifting.

FIGS. 7-10 illustrate a power-assisted bicycle 60 in accordance with a second embodiment of the present invention. This second embodiment is substantially similar to the aforesaid first embodiment with the following exceptions:

The change of the assistant power during the before-shifting time period T1 and the after-shifting time period T3 is to increase or reduce the assistant power to the desired level directly instead of the measure of the aforesaid first embodiment to increase or reduce the assistant power gradually in a linear relationship relative to time.

Further, during the before-shifting time period, the microcomputer 21 controls the power assistance provider 12 to change its current assistant power to the predetermined low assistant power P1 (i.e., 10%) directly without through the predetermined medium assistant power P2. This measure can also smoothen gear shifting by means of the predetermined low assistant power P1 without using the predetermined medium assistant power P2 to enhance chain engagement.

Figure 7:
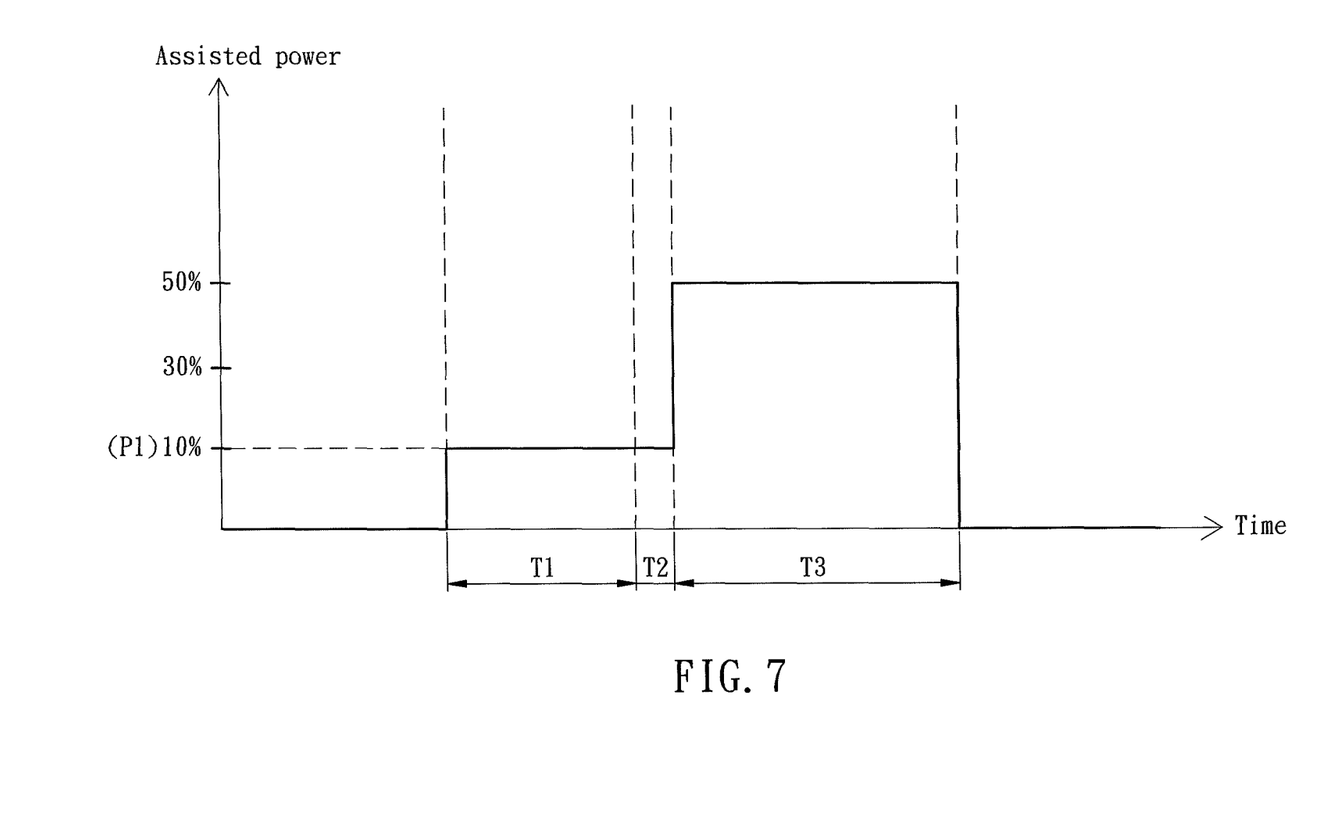
FIG. 7 is a schematic drawing illustrating a change of the assisted power during an upshifting operation under the non-assistant mode according to the second embodiment of the present invention.

FIG. 7 illustrates a status of upshifting under the non-assistant mode.

Figure 8:
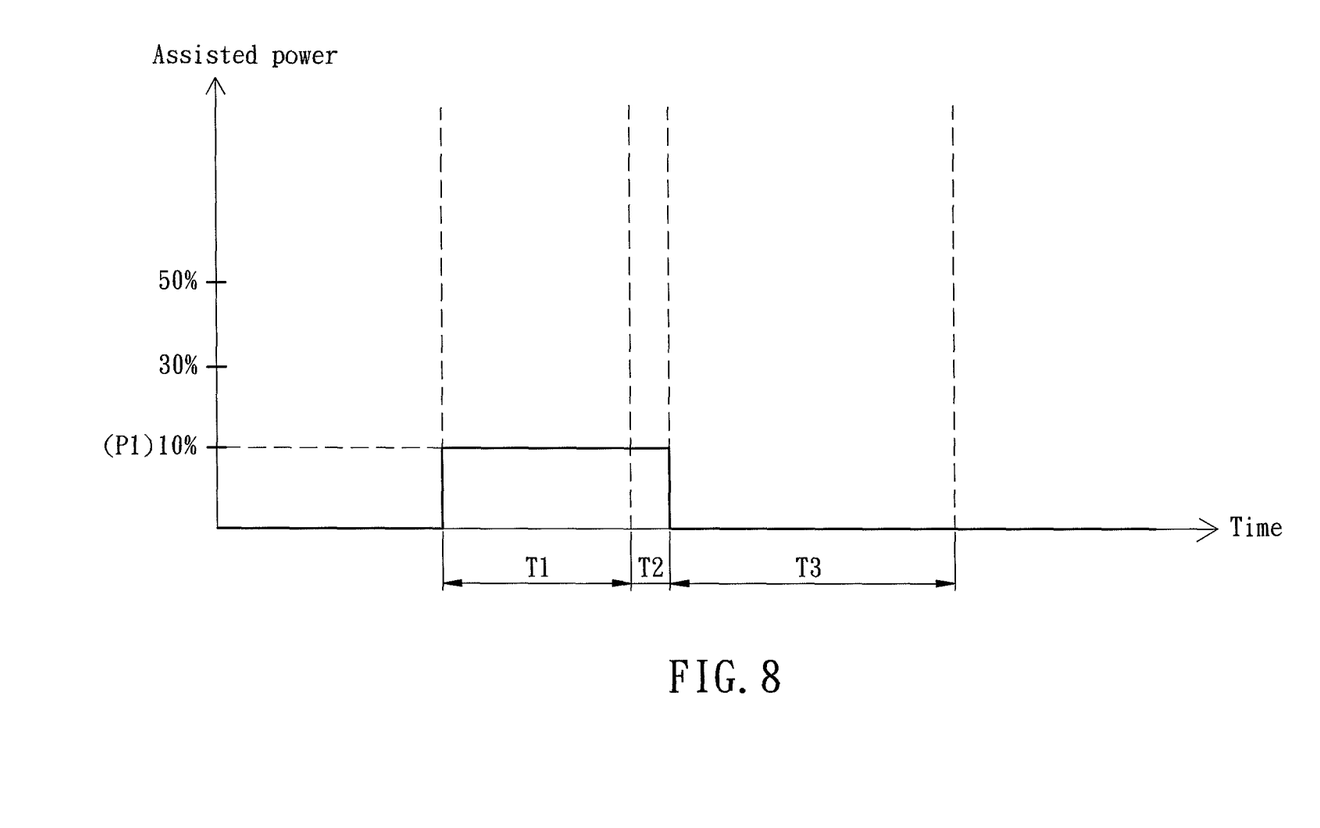
FIG. 8 is a schematic drawing illustrating a change of the assisted power during a downshifting operation under the non-assistant mode according to the second embodiment of the present invention.

FIG. 8 illustrates a status of downshifting under the condition of non-assistant mode.

Figure 9:
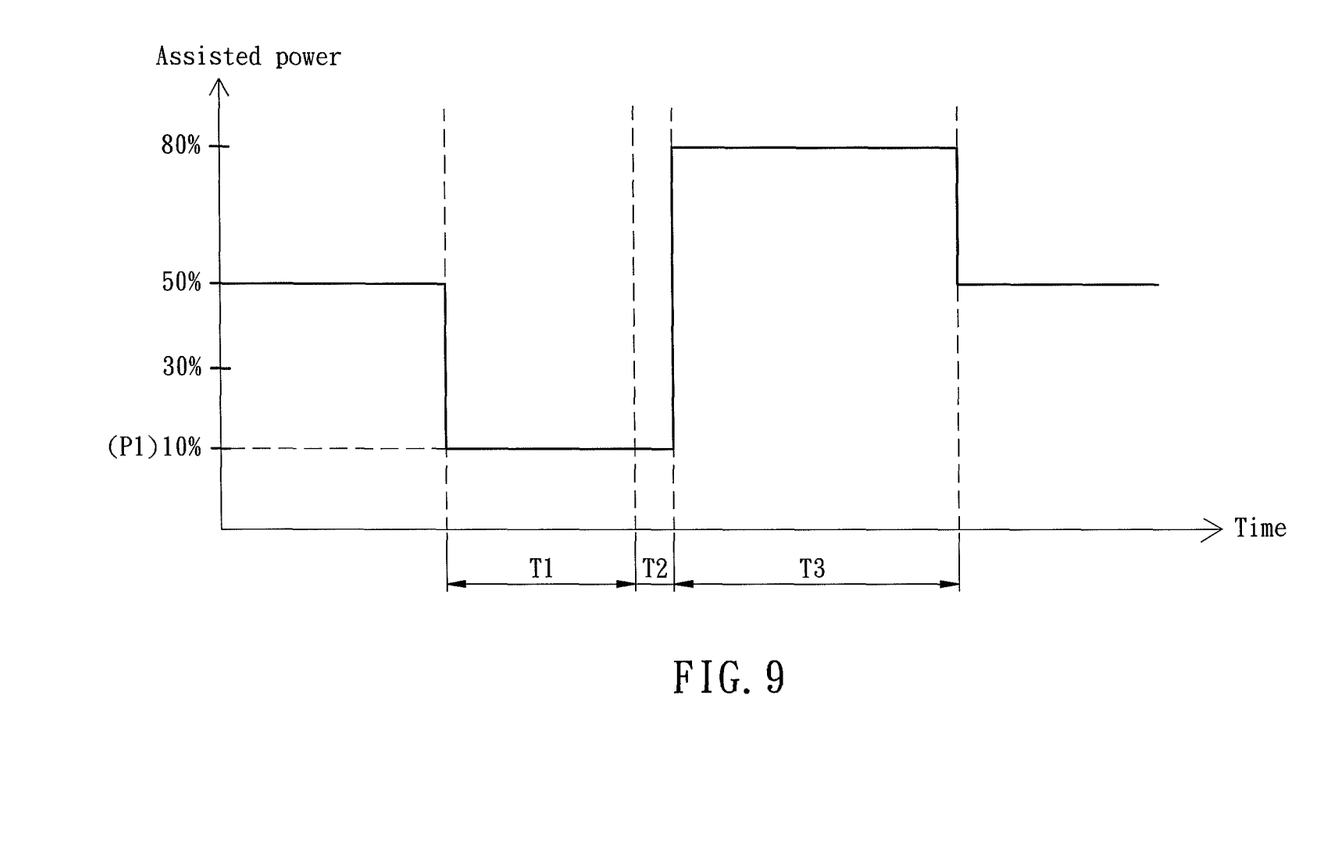
FIG. 9 is a schematic drawing illustrating a change of the assisted power during an upshifting operation under the assistant mode according to the second embodiment of the present invention.

FIG. 9 illustrates a status of upshifting under the assistant mode.

Figure 10:
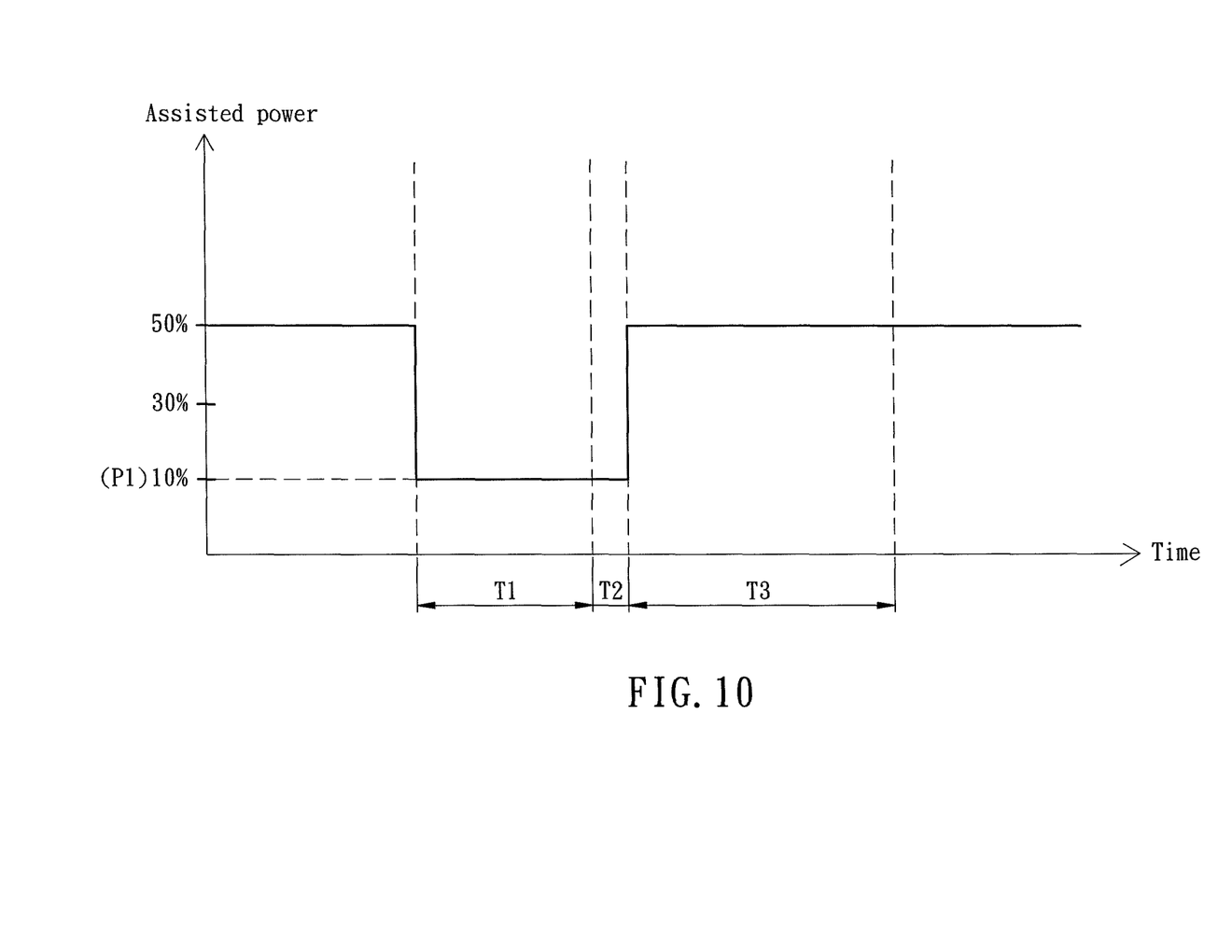
FIG. 10 is a schematic drawing illustrating a change of the assisted power during a downshifting operation under the assistant mode according to the second embodiment of the present invention.

FIG. 10 illustrates a status of downshifting under the assistant mode.

The other composition components of this second embodiment and its effects are same as the aforesaid first embodiment, no further detailed description in this regard is necessary.

Thus, from the above description, it can be seen that the present invention achieve the effects: giving off a warning signal to make the rider get prepared mentally before shifting; maintaining a low assistant power during the gear-shifting to smoothen shifting; adjusting the assistant power after gear-shift to buffer the sudden change of pedaling torque and to avoid making the rider feel awkward.

Further, it should be noted that the motor 14 of the power assistance provider 12 can be a front-wheel motor, rear-wheel motor or mid-mount motor. Further, the derailleur 16 can be selectively configured subject internal-geared architecture or external-geared architecture.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A power-assisted bicycle, comprising:
   a bicycle body comprising a power assistance provider and a derailleur;
   a microcomputer electrically coupled with said power assistance provider and adapted for controlling said power assistance provider to provide an assistant power output;
   a gear-shift control driver electrically connected to said microcomputer and physically connected to said derailleur for driving said derailleur to shift gears subject to the control of said microcomputer;
   at least one sensor mounted at said bicycle body at a respective selected location and electrically connected to said microcomputer for sensing at least one of the conditions of wheel speed, pedaling speed, pedaling force and slope and providing at least one sensing signal for causing said microcomputer to generate at least one detection result and to determine gearshift timing subject to said at least one detection result, said at least one sensor including at least one of a wheel speed sensor and a pedaling speed sensor; and
   wherein when the wheel speed meets a first condition or the pedaling speed meets a second condition during the operation of said microcomputer to judge gearshift timing, said microcomputer divides the time period of the gear-shifting process into a before-shifting time period, an in-shifting time period and an after-shifting time period, and controls said power assistance provider to provide an assistant power output and said gear-shift control driver to drive said derailleur to shift gears during the three time periods of before-shifting time period, in-shifting time period and after-shifting time period; and
   wherein:
   said microcomputer controls said power assistance provider to change the current assistant power output thereof to a predetermined low assistant power during said before-shifting time period;
   said microcomputer controls said power assistance provider to maintain said predetermined low assistant power and said gear-shift control driver to drive said derailleur to shift gears during said in-shifting time period;
   said microcomputer controls said power assistance provider to change the assistant power output from said predetermined low assistant power to a level higher than the current assistant power output thereof when gearing up during said after-shifting time period, and then controls said power assistance provider to return to said current assistant power output after the end of said after-shifting time period.

2. A power-assisted bicycle, comprising:
   a bicycle body comprising a power assistance provider and a derailleur;
   a microcomputer electrically coupled with said power assistance provider and adapted for controlling said power assistance provider to provide an assistant power output;
   a gear-shift control driver electrically connected to said microcomputer and physically connected to said derailleur for driving said derailleur to shift gears subject to the control of said microcomputer;
   at least one sensor mounted at said bicycle body at a respective selected location and electrically connected to said microcomputer for sensing at least one of the conditions of wheel speed, pedaling speed, pedaling force and slope and providing at least one sensing signal for causing said microcomputer to generate at least one detection result and to determine gearshift timing subject to said at least one detection result, said at least one sensor including at least one of a wheel speed sensor and a pedaling speed sensor; and
   wherein when the wheel speed meets a first condition or the pedaling speed meets a second condition during the operation of said microcomputer to judge gearshift timing, said microcomputer divides the time period of the gear-shifting process into a before-shifting time period, an in-shifting time period and an after-shifting time period, and controls said power assistance provider to provide an assistant power output and said gear-shift control driver to drive said derailleur to shift gears during the three time periods of before-shifting time period, in-shifting time period and after-shifting time period; and
   wherein:
   said microcomputer controls said power assistance provider to change the current assistant power output thereof to a predetermined low assistant power during said before-shifting time period;
   said microcomputer controls said power assistance provider to maintain said predetermined low assistant power and said gear-shift control driver to drive said derailleur to shift gears during said in-shifting time period;

said microcomputer controls said power assistance provider to change the assistant power output from said predetermined low assistant power to a level higher than the current assistant power output thereof when gearing up during said after-shifting time period, and then controls said power assistance provider to return the assistant power output to said current assistant power output after the end of said after-shifting time period;

said microcomputer controls said power assistance provider to change the assistant power output from said predetermined low assistant power to said current assistant power output when gearing down during said after-shifting time period.

3. The power-assisted bicycle as claimed in claim 1, wherein said predetermined low assistant power is below 20% of the maximum assistant power output of said power assistance provider.

4. The power-assisted bicycle as claimed in claim 1, wherein said before-shifting time period is shorter than 2 seconds; said in-shifting time period is shorter than 1 second; said after-shifting time period is shorter than 2 seconds.

5. The power-assisted bicycle as claimed in claim 1, wherein said power assistance provider is controllable to change the assistant power output thereof subject to different slopes or different gear ratios when operating under an assistant mode; said at least one sensor includes a slope sensor.

6. The power-assisted bicycle as claimed in claim 1, wherein said microcomputer controls said power assistance provider to change the current assistant power output thereof to a predetermined medium assistant power and then to said predetermined low assistant power during said before-shifting time period.

7. The power-assisted bicycle as claimed in claim 6, wherein said predetermined medium assistant power is directly proportionally changeable subject to the pedaling force or chain tension.

8. The power-assisted bicycle as claimed in claim 1, wherein the assistant power output of said power assistance provider is increased or reduced during said before-shifting time period and said after-shifting time period in a linear relationship relative to time.

9. The power-assisted bicycle as claimed in claim 1, further comprising an alarm electrically connected to said microcomputer and controllable by said microcomputer to give off a warning signal.

10. The power-assisted bicycle as claimed in claim 9, wherein said alarm is selected from the group of buzzer, light-emitting diode and display device.

11. The power-assisted bicycle as claimed in claim 2, wherein the operation of upshifting is limited to upslope during said before-shifting time period, and prohibited when the power-assisted bicycle is running down a slope or on a flat ground; said at least one sensor includes a slope sensor.

12. The power-assisted bicycle as claimed in claim 1, wherein said first condition is that the wheel speed is greater than a predetermined first speed and said second condition is that the pedaling speed is greater than a predetermined second speed when said microcomputer judges the gear-shift operation is to gear up; said first condition is that the wheel speed is lower than said predetermined first speed and said second condition is that the pedaling speed is lower than said predetermined second speed when said microcomputer judges the gear-shift operation is to gear down.

13. The power-assisted bicycle as claimed in claim 2, wherein said predetermined low assistant power is below 20% of the maximum assistant power output of said power assistance provider.

14. The power-assisted bicycle as claimed in claim 2, wherein said before-shifting time period is shorter than 2 seconds; said in-shifting time period is shorter than 1 second; said after-shifting time period is shorter than 2 seconds.

15. The power-assisted bicycle as claimed in claim 2, wherein said power assistance provider is controllable to change the assistant power output thereof subject to different slopes or different gear ratios when operating under an assistant mode; said at least one sensor includes a slope sensor.

16. The power-assisted bicycle as claimed in claim 2, wherein said microcomputer controls said power assistance provider to change the current assistant power output thereof to a predetermined medium assistant power and then to said predetermined low assistant power during said before-shifting time period.

17. The power-assisted bicycle as claimed in claim 16, wherein said predetermined medium assistant power is directly proportionally changeable subject to the pedaling force or chain tension.

18. The power-assisted bicycle as claimed in claim 2, wherein the assistant power output of said power assistance provider is increased or reduced during said before-shifting time period and said after-shifting time period in a linear relationship relative to time.

19. The power-assisted bicycle as claimed in claim 2, further comprising an alarm electrically connected to said microcomputer and controllable by said microcomputer to give off a warning signal.

20. The power-assisted bicycle as claimed in claim 19, wherein said alarm is selected from the group of buzzer, light-emitting diode and display device.

21. The power-assisted bicycle as claimed in claim 2, wherein said first condition is that the wheel speed is greater than a predetermined first speed and said second condition is that the pedaling speed is greater than a predetermined second speed when said microcomputer judges the gear-shift operation is to gear up; said first condition is that the wheel speed is lower than said predetermined first speed and said second condition is that the pedaling speed is lower than said predetermined second speed when said microcomputer judges the gear-shift operation is to gear down.

* * * * *